United States Patent Office  3,083,731
Patented Apr. 2, 1963

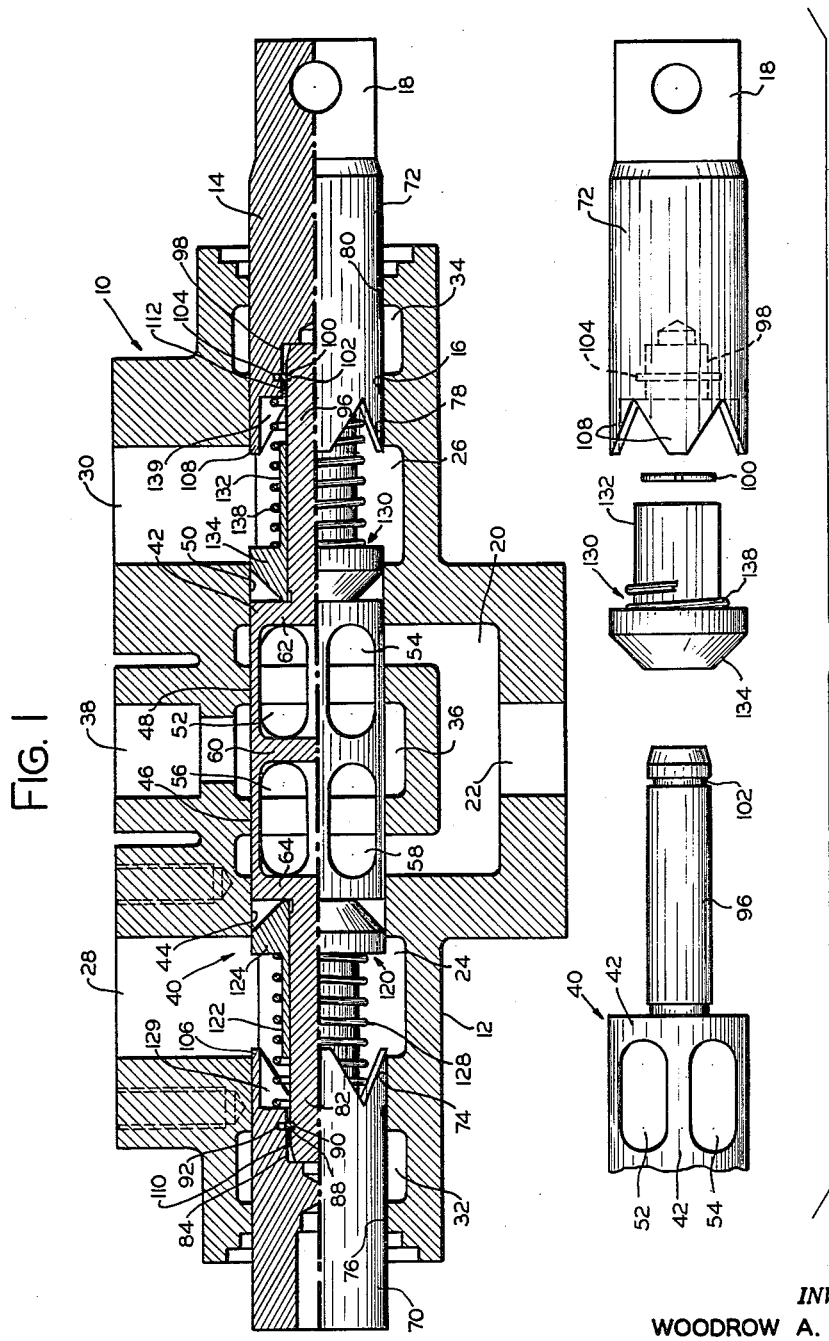

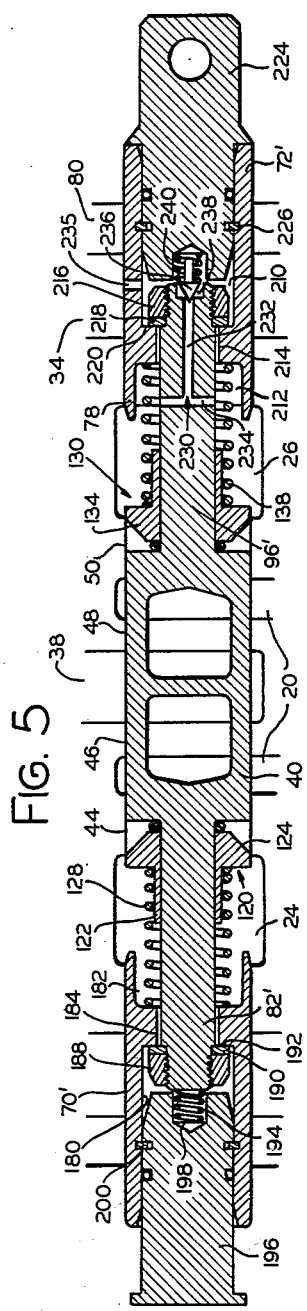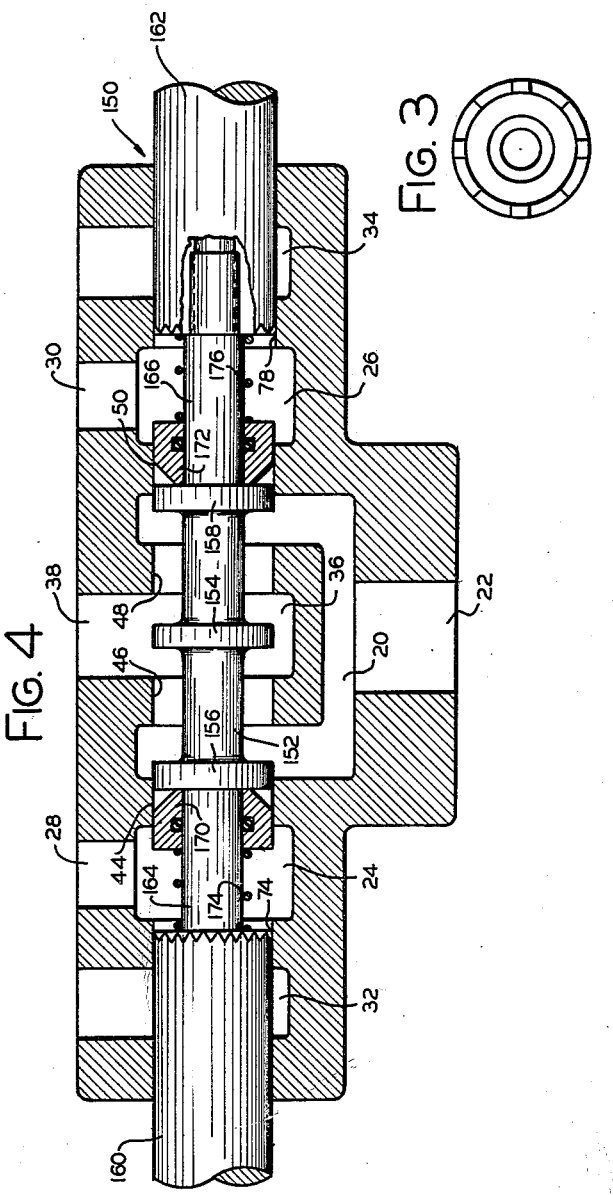

3,083,731
VALVE CONSTRUCTION
Woodrow A. Hasbany, South Bend, Ind., assignor to Clark Equipment Company, a corporation of Michigan
Filed Apr. 4, 1960, Ser. No. 19,874
15 Claims. (Cl. 137—622)

The present invention relates to valves, and more particularly to directional control valves for actuating and controlling hydraulically operated equipment and mechanisms.

Directional control valves are extensively used in the industrial field and off-the-road machinery primarily to control and operate lifting, lowering, tilting, ejecting, rotating, steering and other similar positioning of mechanisms in which the primary power mechanisms are either single or double acting hydraulic cylinders. Basically, the conventional valves of this type have either series or parallel circuits with open or closed center systems and either 3-way single-acting or 4-way double-acting spools. A parallel circuit system in a multi-spool design allows simultaneous operation when two or more spools are actuated at the same time. This permits the operator to lift and tilt simultaneously, provided the restrictions in the left and tilt circuits are the same; otherwise, the circuit with the least restrictions actuates ahead of the other. A series or priority circuit system in a multi-spool design allows only single spool actuation, provided that the spool manipulated is the first spool upstream in the multi-spool body. The series circuit otherwise resembles the parallel circuit up to whichever spool away from the inlet port is being used. In a 4-spool valve unit, it is possible to manipulate the last spool downstream and have parallel circuit operation for all the other spools upstream. It is seen that a series circuit is a combination of series and parallel and that a parallel circuit is not true parallel, since the restrictions in the various lines are not equal and cause unpredictable performance of the various motions to be controlled simultaneously.

The open center system allows the pump to discharge its full rated capacity freely through open center passages back to the tank with no pressure build-up except from that created by the pressure drop through the valves in neutral position and the coring of the valve body itself; consequently, no power is required except when actual work is being done. The valves themselves control the flow rate, the direction of flow and the resultant flow pressure. The closed center system, on the other hand, causes the pump to operate constantly against a regulating valve set for the maximum pressure of the system, and hence causes a considerable waste of power as well as shorter pump life. Further, no real gain is made by its use because, as soon as the control valve is actuated, a substantial pressure drop occurs when bypass flow is diverted to work flow. In some applications, this pressure drop is reduced by the use of an expensive accumulator system. The valves in this type of system present considerable difficulty from the standpoint of metering for relatively untrained operators.

A 4-way double-acting valve or spool is used in conjunction with a double-acting work cylinder, permitting hydraulic fluid to be directed to either end of the work piston. In order for the work cylinder to function properly, the spool in one direction of motion must energize one end of the work piston and simultaneously exhaust the opposite end. When the spool is moved in the opposite direction, the functions of the work piston must reverse themselves. In the center or neutral position of the spool, the function of the spool is to lock or hold the work piston hydraulically and allow the pump flow to revert back to the tank without any appreciable loss of power. The 3-way single-acting spool is used with single-acting work cylinders and needs only to energize one end of the work piston in that the other end is vented directly to the tank or atmosphere and the work load is the returning force.

In valves of the foregoing type, close tolerances between the spools and respective bores have been necessary in order to prevent leakage while the valve is in neutral-hold, and consequently binding has often been a major problem, particularly if any distortion occurs from mounting the valve on the equipment or from excessive pressure load deflections. It is therefore one of the principal objects to provide a valve of the aforesaid type, having spools or plungers, which consists of a number of separately fabricated and machined parts adapted to be assembled into an integral unit and in which the parts remain sufficiently loosely connected that they can adapt themselves to slight misalignment of the bore and distortions of the valve body.

Another object of the invention is to provide an articulated plunger construction, the parts of which can readily and inexpensively be cast and/or machined to provide good throttling or feathering in the operation of the valve plunger between neutral and drive positions, and which can be installed in a fully assembled condition in a valve housing of relatively simple construction.

Another object of the present invention is to provide a comparatively simple, easily fabricated and relatively inexpensive spool valve wherein it is possible to shift the plunger from neutral to drive positions without any intermediate period in which the pump supply line is blocked or in which the connected cylinder is momentarily free to discharge in response to load pressures on the piston cylinder.

Still another object of the invention is to provide in a spool type valve a plunger of articulated construction, the parts of which are initially self-aligning in the bore of the valve housing and thereafter during the normal wear of the valve parts.

A further object is to provide a spool valve in which the housing and plunger of the aforesaid construction are cast or otherwise produced from the same kind of material and in which the clearance between the valve bore and plunger is initially less than in similar conventional valves and remains unchanged over the entire operating temperature range, thereby giving maximum leakage control between the valve parts.

In load handling and lifting mechanisms it is important for a satisfactory performance to minimize or eliminate load drop when the handling or lifting mechanism is shifting from one operation or position to another. It is one of the primary objects of the invention to provide a novel take-away lift feature for eliminating load drop, which is incorporated in the plunger of the valve and which can be readily assembled in plungers of the present articulated construction.

Another object of the invention is to provide a simple, compact means incorporated within the valve plunger for reducing or eliminating shock to the hydraulic system from sudden stoppage of fluid flow by the control valve.

Additional objects and advantages of the present invention will become apparent from the following description and accompanying drawings, wherein:

FIGURE 1 is a longitudinal cross sectional view of a spool type valve having incorporated therein the present novel plunger shown partially in cross section and partially in elevation, the housing being partly rearranged to illustrate better the construction and operation of the valve;

FIGURE 2 is an exploded elevational view of a portion of the valve plunger shown in FIGURE 1, illustrating the manner in which the plunger is assembled;

FIGURE 3 is an end elevational view of one part of the plunger shown in the preceding FIGURES;

FIGURE 4 is a longitudinal cross sectional view of a modified form of my spool valve, showing the plunger thereof principally in elevation; and FIGURE 5 is a longitudinal cross sectional view of a plunger of a spool valve, illustrating a further modified form of the present invention, and showing the adjacent parts of the valve housing schematically.

Referring more specifically to the drawings and to the embodiment of the present invention illustrated in FIGURES 1 through 3, numeral 10 designates an open center, 4-way double-acting spool valve having a housing 12 and a plunger 14 seated in longitudinal bore 16 in the housing and having an extension 18 on one end thereof for connecting the plunger to either a manually or power operated actuating lever. The valve shown in FIGURE 1 is a single plunger type suitable for use in a variety of different types of hydraulic systems, the one shown being designed primarily for controlling a double acting hydraulic work cylinder (not shown) of well known construction in a system having a reservoir and a positive displacement pump for supplying hydraulic fluid from the reservoir to the valve and thence through lines to either end of the cylinder. The pump is continuously operating and the fluid from the pump is returned directly to the reservoir while the valve plunger is in its neutral position shown in FIGURE 1. The hydraulic system and the components thereof aside from the valve form no part of the present invention and will not be described herein.

The housing 12 of the valve contains a chamber 20 connected through inlet opening 22 with the outlet of the fluid supply pump and through bore 16, outlet chambers 24 and 26 with openings 28 and 30, respectively, the latter openings being connected by conduits (not shown) with opposite ends of the hydraulic cylinder. Chambers 24 and 26 are also connected to the reservoir through the bore, return chambers 32 and 34 and return conduits (not shown). Chamber 20 is also connected through return recirculation chamber 36 and opening 38 with a conduit (not shown) leading to the reservoir for returning the hydraulic fluid to its source while plunger 14 is in its neutral position and the hydraulic cylinder is inoperative. The housing is constructed of cast iron or other suitable material with chambers 20, 24 and 26 being cored therein and bore 16 drilled or otherwise machined.

Plunger 14, in which the present invention primarily resides, consists of a central cylindrical member 40 having an enlarged portion 42 slidably engaging the walls of bore 16 at lands 44, 46, 48 and 50 and containing a plurality of openings 52 and 54 on the right side and 56 and 58 on the left side of the center, as viewed in FIGURE 1. The openings on the right side are separated from those on the left side by a central partition 60 which, together with end partitions 62 and 64, in effect forms three separate lands on portion 42 cooperating with the lands of the bore to control the flow of fluid from chamber 20 through chamber 36 and opening 38 to the return line to the reservoir while the valve is in its neutral position, and to control the flow from chamber 20 to either chambers 24 or 26 and their respective lines to the hydraulic cylinder when the plunger is moved to the right or left. If the plunger is shifted to the right, for example, lands 60 and 64 cooperating with lands 48 and 46 of the bore interrupt the flow of fluid into chamber 36.

The flow of fluid through chambers 24 and 26 either to the respective ends of the hydraulic cylinder or to chambers 32 and 34 and thence to the reservoir, is controlled by cylindrical end members 70 and 72, the former being in slidable engagement with bore lands 74 and 76 and spanning chamber 32, and the latter being in slidable engagement with bore lands 78 and 80 and spanning chamber 34. Member 70 is connected to central member 40 by a stem 82 which is axially aligned and preferably formed integrally with portion 42 and which extends into an axial recess 84 in the inner end of member 70. The stem and member are held permanently together once they have been assembled by a snap ring 88 seated in an annular groove 90 in the stem and an annular groove 92 in the inner wall of the recess. Member 72 is connected to member 40 with a similar structure consisting of a stem 96 seating in recess 98 and being locked therein by a snap ring 100 seating in annular grooves 102 and 104 of stem 96 and member 72. The inner ends 106 and 108 of members 70 and 72 contain deep V-notches which effectively give a better metering means when the members are moved toward open position to relieve the fluid in the respective end of the hydraulic cylinder. These V-notches provide exceptional metering control in that a large movement of the control lever to the plunger results in a relatively small initial opening of the cylinder ports and a gradual closing of the by-pass through the valve.

The articulated plunger construction just described permits the plunger to be machined in separate parts and thus avoids some of the intricate machining operations encountered in producing a plunger in a single piece. When the plunger has been assembled with snap rings 88 and 100 seated in their respective grooves, the plunger parts remain permanently together and will not become accidentally separated or displaced from one another. Since the plunger in the present type of valve must normally span a number of spaced lands in the valve body bore, it is advantageous to provide sufficient clearance between the walls of recesses 84 and 98 and their respective stems, as illustrated at numerals 110 and 112, to permit central member 40 and end members 70 and 72 to adjust to any slight misalignment and irregularities which may initially be present in the valve and/or in the bore of the valve housing 12, or which may develop during service.

Mounted on stem 82 is a second stage or plunger valve 120, consisting of a cylindrical stem 122 and frustoconically shaped valve element 124 joined integrally with stem 122 and urged into sliding engagement with bore land 44 by a coil spring 128 on said stems reacting against the back side of valve element 124 and the inner end of recess 129 of plunger member 70. A similar plunger valve 130 is mounted on stem 96, consisting of a cylindrical stem 132 and a frustoconically shaped valve element 134 joined integrally to the valve stem and urged into sliding engagement with bore land 50 by a coil spring 138 on stems 96 and 132 and reacting against the back side of valve element 134 and the inner end of recess 139 of plunger member 72. When the valve plunger is in its neutral-hold position, as shown in FIGURE 1, valve elements 124 and 134 are in bore lands 44 and 50 and are seated on partitions 64 and 62, respectively. As the plunger is moved to the right, for example, partition 64 moves from bore land 44 exposing valve element 124 to the fluid pressure in chamber 20. The fluid pressure is sufficient to overcome the force of spring 128 and forces the element to the left sufficiently to establish communication between chambers 20 and 24, the plunger valve having effectively dammed fluid in the cylinder and prevented the back-flow tendency of the fluid until the pump press has increased sufficiently to overcome the cylinder back pressure. The plunger valve prevents load drop and hence provides an effective take-away lift mechanism. With the valve plunger in its right hand position, just described, the high pressure fluid passes through chamber 24 and opening 28 to one side of the hydraulic cylinder, and simultaneously, with member 72 withdrawn from bore land 78, the fluid in the opposite end of the hydraulic cylinder passes through opening 30, chamber 26 and bore land 78 into chamber 34 and thence to the reservoir. The V-notches on the inner ends of the members serve to reduce shock and to give hairline control in the operation of the valve, and consequently no back pressure is built up in the pump circuit to damage the pump. The fluid flow is always continuous either through the valve or to the cylinder or through a relief valve.

A simplified form of the present valve is illustrated in FIGURE 4 wherein the valve body parts which are of substantially the same construction as in the one shown in FIGURE 1 are given the same numeral designations. The plunger 150 consists of a central member 152 having a center land 154 slidable in bore lands 46 and 48, two end lands 156 and 158 slidable in bore lands 44 and 46 and 48 and 50, respectively. End members 160 and 162 of the plunger are formed as parts separate from the central portion and are secured to stems 164 and 166 by snap rings and grooves of the same construction as those shown in FIGURES 1 and 2 or by any other suitable connecting means. Plunger valves 170 and 172 are mounted on stems 164 and 166 and are urged into bore lands 44 and 48 by coil springs 174 and 176 reacting between the back side of the valves and the respective adjacent end members 160 and 162. The plunger may not be the self aligning construction shown in the preceding figures. The end members 160 and 162 instead may be threaded or otherwise rigidly secured to stems 164 and 166 after valves 170 and 172 and the respective springs are assembled on the stems. The operation of this modified valve construction is the same as the first valve embodiment described herein.

A further modified form of my articulated valve plunger construction is shown in FIGURE 5, and since the valve housing and central portion of the plunger are the same as those disclosed in FIGURES 1, 2 and 3, the parts thereof have been given the same numeral designations. End member 70' is cylindrical shaped and contains a central bore with large sections 180 and 182 in the outer and inner ends of the member and a reduced diameter section 184 between the larger sections. In assembling the end member, valve 124 and spring 128 are first mounted in position on stem 82' and then member 70' is slipped onto stem 82' with the end of the stem extending through section 184 into section 180. The free end of stem 82' is threaded to receive a nut 188 which, together with a seal washer 190, forms an annular abutment on the end of stem 82' against which annular wall 192 seats. The wall is urged into contact with the abutment by spring 128 reacting between the back side of valve 124 and the wall. In order to reduce back lash in the movement of the plunger, a spring 194 is interposed between the free end of stem 82' and an insert 196 seated in section 180. Insert 196 contains a recess 198 for retaining spring 194 in proper alignment with the stem and is retained in place by a snap ring 200 seated in grooves in the internal and external walls of member 70' and insert 196, respectively.

The construction of end member 72' is substantially the same as end member 70', consisting of a cylindrical shaped body having a central bore with large sections 210 and 212 in the outer and inner ends of the member, and a reduced diameter section 214 between the larger sections. In assembling this end member, valve 134 and spring 138 are mounted on stem 96' and member 72' is slipped onto the stem with the end thereof extending through section 214 into section 210. The free end of stem 96' is threaded to receive a nut 216 and retain seal washer 218 thereon as an abutment for wall 220 of end member 72'. The wall is urged into contact with the abutment by spring 138 reacting between the back side of valve 134 and the wall. A cylindrical insert 224 is secured in large section 210 by snap ring 226 seated in grooves in the internal and external walls of member 72' and insert 224, respectively.

The modified form of the present valve shown in FIGURE 5 includes a poppet valve means 230 for eliminating or minimizing the hammer condition created by the sudden stoppage of fluid flow in the hydraulic system, the valve means consisting of a longitudinal passage 232 in stem 96' connected at one end to chamber 26 by transverse passage 234, and at the other end to enlarged section 210 which in turn is connected to chamber 34 leading to the return line and the reservoir by port 235. A valve element 236 disposed in a recess 238 seats around the end of passage 232 and is urged onto its seat by spring 240 interposed between the valve element and the adjacent end of insert 224, the latter spring performing the dual function of seating the valve element and reducing back lash in the movement of the plunger in the same manner as spring 194. The pressure setting for the poppet valve, as determined by spring 240, is slightly higher than the setting on the conventional relief valve included in the hydraulic system so that the poppet valve will open only momentarily to relieve the hammer or shock on the system when the fluid flow therein is stopped abruptly. With the exception of this transient condition in the operation of the hydraulic system, poppet valve means 230 has no effect on the operation of the system. While the poppet valve and passage controlled thereby are shown only in stem 96' they would normally be also included in stem 82'.

The present articulated plunger may be used either with or without the plunger valves 120 and 130 and it may be used in single or multiple spool valves of various types. Likewise the plunger valves may be used in conjunction with other types of spool valve plungers, as illustrated in FIGURE 4, and the poppet valve can be incorporated in other types of plungers. Other modifications and changes may be made without departing from the scope of the present invention.

I claim:

1. A valve for controlling the operation of a double acting cylinder, comprising a housing containing a bore and having arranged progressively longitudinally outwardly along said bore on opposite sides of the center thereof a fluid recirculation chamber, a fluid inlet chamber, a fluid outlet chamber, and a fluid return chamber for the cylinder, lands in said bore on opposite sides of said chambers, a longitudinally movable plunger extending through said bore, said plunger having a cylindrical center section with three spaced lands thereon slidable in the lands of said bore between said recirculation chamber and said inlet chamber and between said inlet chamber and said outlet chamber, axial stems of reduced diameter on opposite ends of said center section, cylindrical end members of substantially the same diameter as said bore slidable in the lands on opposite sides of the respective fluid return chambers and having an axial recess in the inner end thereof for receiving the free end of the respective stem, the relative diameters of the respective stem and recess being such as to provide a loose fitting relationship between said stem and recess, registerable annular grooves on the inner and outer walls of said recess and corresponding stem, snap rings in said grooves for retaining said members on said stems, a longitudinally movable frusto-conically shaped valve element mounted on each stem with the small end thereof facing the center section, and a coil spring on each stem urging the respective element toward said section and into the land between said inlet chamber and the respective outlet chamber.

2. A valve for controlling a hydraulic power mechanism, comprising a housing containing a bore and having arranged progressively longitudinally outwardly along said bore on opposite sides of the center thereof a fluid recirculation chamber, a fluid inlet chamber, a fluid outlet chamber, and a fluid return chamber, lands in said bore on opposite sides of said chambers, a longitudinally movable plunger in said bore, said plunger having a cylindrical center section with three spaced lands thereon slidable in the lands of said bore between said recirculation chamber and said inlet chamber and between said inlet chamber and said outlet chamber, axial stems of reduced diameter on opposite ends of said center section, cylindrical end members in said bore slidable in the lands on opposite sides of the respective fluid return chambers and movable to axial offset positions relative to the respective stem, means laterally shiftable in all directions relative to the respective stem for securing said end members onto the stems, a longitudinally movable frustoconically shaped valve element mounted on each stem with the small end thereof facing the center section, and a coil spring on each stem urging the element thereon toward said section and into the land between said inlet chamber and the respective outlet chamber.

3. A valve for controlling a hydraulic power mechanism, comprising a housing containing a bore and having arranged progressively longitudinally along said bore a fluid recirculation chamber, a fluid inlet chamber, a fluid outlet chamber, and a fluid return chamber, lands in said bore on opposite sides of said chambers, a longitudinally movable plunger in said bore, said plunger having a cylindrical section with spaced lands thereon slidable in the lands of said bore between said recirculation chamber and said inlet chamber and between said inlet chamber and said outlet chamber, an axial stem on said cylindrical section, a cylindrical end member in said bore slidable in the lands on opposite sides of the fluid return chamber and movable to axial offset positions relative to the stem, and means laterally shiftable in all directions with respect to said stem for securing said end member onto the stem.

4. A valve, comprising a housing containing a bore and having arranged progressively longitudinally along said bore a fluid recirculation chamber, a fluid inlet chamber, a fluid outlet chamber, and a fluid return chamber, lands in said bore on opposite sides of said chambers, a longitudinally movable plunger in said bore, said plunger having a cylindrical section with spaced lands thereon slidable in the lands of said bore between said recirculation chamber and said inlet chamber and between said inlet chamber and said outlet chamber, an axial stem on said cylindrical section, a cylindrical end member in said bore slidable in the lands on opposite sides of the fluid return chamber and movable to axial offset positions relative to the stem, means laterally shiftable in all directions with respect to said stem for securing said end member onto the stem, a longitudinally movable valve element mounted on said stem, and a spring on said stem urging the element toward said section and into the land between said inlet chamber and said outlet chamber.

5. A valve, comprising a housing containing a bore and having arranged progressively longitudinally along said bore a fluid recirculation chamber, a fluid inlet chamber, a fluid outlet chamber, and a fluid return chamber, lands in said bore on opposite sides of said chambers, a longitudinally movable plunger in said bore, said plunger having a cylindrical section with spaced lands thereon slidable in the lands of said bore between said recirculation chamber and said inlet chamber and between said inlet chamber and said outlet chamber, an axial stem on said cylindrical section, a cylindrical end member in said bore slidable in the lands on opposite sides of the fluid return chamber and having an axial recess in the inner end thereof for receiving the free end of said stem, the relative diameters of the stem and recess being such as to provide a loose fitting relationship between said stem and recess, registerable annular grooves in the walls of said recess and stem, a snap ring in said grooves for retaining said member on said stem, a longitudinally movable valve element mounted on said stem, and a spring on said stem urging said element toward said section and into the land between said inlet chamber and said outlet chamber.

6. A valve, comprising a housing containing a bore and having arranged progressively longitudinally along said bore a fluid recirculation chamber, a fluid inlet chamber, a fluid outlet chamber, and a fluid return chamber, lands in said bore on opposite sides of said chambers, a longitudinally movable plunger in said bore, said plunger having a cylindrical section with spaced lands thereon slidable in the lands of said bore between said recirculation chamber and said inlet chamber and between said inlet chamber and said outlet chamber, an axial stem on said cylindrical section, a cylindrical end member in said bore slidable in the lands on opposite sides of the fluid return chamber and having an axial recess in the inner end thereof for receiving the free end of said stem, the relative diameters of the stem and recess being such as to provide a loose fitting relationship between said stem and recess, registerable annular grooves on the walls of said recess and corresponding stem, and a snap ring in said grooves for retaining said member on said stem.

7. A valve, comprising a housing cntaining a bore and having a fluid inlet chamber and a fluid outlet chamber disposed along said bore, lands in said bore on opposite sides of said chambers, a longitudinally movable plunger in said bore, said plunger having a cylindrical section with spaced lands thereon slidable in the lands of said bore between said inlet chamber and said outlet chamber, an axial stem on said cylindrical section extending through said outlet chamber, a cylindrical end member slidable in one of the bore lands adjacent said outlet chamber and laterally shiftable to axial offset positions in all directions with respect to said stem, and means securing said end member onto the free end of said stem.

8. A valve, comprising a housing having a bore and a fluid inlet chamber and a fluid outlet chamber disposed along said bore, lands in said bore on opposite sides of said chambers, a longitudinally movable plunger in said bore, said plunger having a cylindrical section with spaced lands thereon slidable in the lands of said bore between said inlet chamber and said outlet chamber, an axial stem on said cylindrical section, a cylindrical end member in said bore secured to said stem and laterally shiftable to axial offset positions in all directions relative to said stem, a longitudinally movable valve element mounted on said stem, and a spring on said stem urging said element toward said section and into the land between said inlet and outlet chambers.

9. A valve, comprising a housing having a bore and a fluid inlet chamber and a fluid outlet chamber disposed along said bore, lands in said bore on opposite sides of said chambers, a longitudinally movable plunger in said bore, said plunger having a cylindrical section with spaced lands thereon slidable in the lands of said bore between said inlet chamber and said outlet chamber, an axial stem on said cylindrical section, a cylindrical end member disposed in said bore and having an axial recess in the inner end thereof for receiving the free end of said stem, the relative diameters of the stem and recess being such as to provide a loose fitting relationship between said stem and recess, registerable annular grooves on the walls of said recess and stem, and a snap ring in said grooves for retaining said member on said stem.

10. In a spool valve, a plunger having a cylindrical section with spaced lands thereon, an axial stem connected to said cylindrical section, a cylindrical end member having an axial recess for receiving the free end of said stem, the relative diameters of the stem and recess being such as to provide a loose fitting relationship between said stem and recess, registerable annular grooves on the walls of said recess and stem, and a snap ring in said grooves for retaining said member on said stem.

11. A plunger for a valve, comprising a cylindrical section with lands thereon, an axial stem connected to said cylindrical section, a cylindrical end member having an axial recess for receiving the free end of said stem, the relative diameters of the stem and recess being such as to provide a loose fitting relationship between said stem and recess, registerable annular grooves on the walls of said recess and stem, and a snap ring in said grooves for retaining said member on said stem.

12. In a spool valve, a plunger having a body section, a stem connected to said section, an end member having an axial recess for receiving the free end of said stem, the relative diameters of the stem and recess being such as to provide a loose fitting relationship between said stem and recess, registerable annular grooves on the walls of said recess and stem, and a means in said grooves for retaining said member on said stem.

13. A valve, comprising a housing containing a bore and having a fluid inlet chamber and a fluid outlet chamber disposed along said bore, lands in said bore on opposite sides of said chambers, a longitudinally movable plunger in said bore, said plunger having a cylindrical section with spaced lands thereon slidable in the lands of said bore between said inlet chamber and said outlet chamber, a cylindrical end section slidable in one of the bore lands adjacent said outlet chamber, and a stem connecting said sections and being laterally shiftable to axial offset positions in all directions relative to one of said sections.

14. A plunger for a valve, comprising a first cylindrical section with fluid control lands thereon, a second cylindrical section with fluid control lands thereon, and a stem connecting said sections and being laterally shiftable to axial offset positions in all directions relative to one of said sections.

15. A plunger for a valve, comprising a first cylindrical section with fluid control lands thereon, a second cylindrical section with fluid control lands thereon, a stem connecting said sections, an axial recess in one of said sections for receiving an end of said stem, the relative diameters of the stem and recess being such as to provide a loose fitting relationship between said stem and recess, registerable annular grooves in the walls of said recess and stem, and a snap ring in said grooves for retaining said one section on said stem.

References Cited in the file of this patent
UNITED STATES PATENTS

| | | |
|---|---|---|
| 2,600,702 | Stephens | June 17, 1952 |
| 2,898,936 | Collins | Aug. 11, 1959 |
| 2,908,292 | Beckett et al. | Oct. 13, 1959 |
| 2,946,347 | Ruhl | July 26, 1960 |